United States Patent [19]

Gladrow et al.

[11] 4,243,557

[45] Jan. 6, 1981

[54] SULFUR TRANSFER CRACKING CATALYST

[75] Inventors: Elroy M. Gladrow; William L. Schuette, both of Baton Rouge; Terry A. Reid, Slaughter, all of La.

[73] Assignee: Exxon Research & Engineering Co., Florham Park, N.J.

[21] Appl. No.: 973,000

[22] Filed: Dec. 26, 1978

[51] Int. Cl.³ .......................... B01J 29/08; B01J 29/12
[52] U.S. Cl. ................................................. 252/455 Z
[58] Field of Search ..................... 252/455 Z; 208/120

[56] References Cited

U.S. PATENT DOCUMENTS

| | | | |
|---|---|---|---|
| 3,304,254 | 2/1967 | Eastwood et al. | 252/455 Z |
| 3,835,031 | 9/1974 | Bertolacini et al. | 208/120 |
| 4,072,600 | 2/1978 | Schwartz | 208/120 |
| 4,115,250 | 9/1978 | Flanders et al. | 208/120 |

*Primary Examiner*—Carl F. Dees
*Attorney, Agent, or Firm*—Llewellyn A. Proctor

[57] ABSTRACT

An improved catalyst, and process utilizing said catalyst for catalytically cracking a sulfur-containing hydrocarbon feed, and for the fixation of sulfur by the catalyst and transfer thereof from the catalyst regeneration zone to the reaction zone of a catalytic cracking unit. The catalyst comprises an admixture of composite particles, one present in major concentration for providing principally cracking and combustion promoting functions, and the other present in minor concentration for providing principally sulfur fixation and transfer functions. The particle present in major concentration, on the one hand, is constituted essentially of one or more Group VIII noble metals, preferably platinum, composited with a support comprised of a crystalline alumino silicate component distributed in an active cracking catalyst matrix, suitably one constituted of silica-alumina. The minor component particle, on the other hand, is comprised of one or more Group II-A metals, preferably magnesium, composited with a support, suitably silica-magnesia or silica-alumina, which may also contain a crystalline aluminosilicate zeolite component dispersed within the silica-magnesia or silica-alumina support matrix.

15 Claims, No Drawings

SULFUR TRANSFER CRACKING CATALYST

Many refinery units provide stocks to form the gasoline blending pools which serve as supplies of motor gasoline. For example, stocks of natural or straight run gasoline are produced from virgin feeds by straight distillation. Alkylation units are employed to react low molecular weight olefins and paraffins to provide stocks within the gasoline boiling range. Cracking units are employed to reduce the molecular weight of feeds, and thereby provide stocks boiling in the gasoline range. Both virgin and cracked feeds in the gasoline boiling range, including naphthas, may be subjected to catalytic reforming, or hydroforming, to provide upgraded stocks, particularly stocks of increased octane. With the phaseout of lead anti-knock compounds it continues a formidable challenge for the refiner to maintain gasoline pools at the octane levels demanded; and, the problem is aggravated by the depletion of conventional petroleum supplies which creates an increased need to process heavy feedstocks such as residua, unconventional heavy crudes and the like for conversion to gasoline.

Cracking processes, both thermal and catalytic, have constituted the heart of petroleum refining operations for several decades. The purpose of both types of process is the same, i.e., to break heavy molecular feed components into lower boiling, more valuable components. The thermal process, which has now been largely replaced by the more effective catalytic process, accomplishes this result by heat, whereas the catalytic process breaks the large molecules by contact between a heavy feed and an active catalyst at lower temperatures than used in thermal processes. The reactions which occur in the catalytic cracking operation are quite complex. They include not only carbon-carbon bond scission but isomerization, alkylation, dehydrocyclization, hydrogen transfer, etc. During the cracking operation a carbonaceous material, or coke, is inevitably deposited on the catalyst. The catalyst, in such unit, is regenerated in a separate vessel, i.e., a regenerator, by burning off the coke to restore its activity. Commonly, the catalyst is continuously cycled between the reactor and regenerator. During cracking the catalyst contacts sulfur-containing feed hydrocarbons which may be in liquid, gaseous or mixed phase. Within the reactor the feed sulfur is converted to hydrogen sulfide, carbon oxysulfide, normally liquid organic sulfur compounds, and the residual sulfur is contained in the coke deposit. Much of the sulfur is removed from the reactor via the reactor flue gas effluent stream. After passage through the cracking zone, the catalyst is passed to the regeneration zone where the coke deposits, which also contain sulfur, are burned off in an oxygen-containing atmosphere at controlled conditions to produce carbon monoxide and carbon dioxide gases. In the combustion most of the sulfur present is converted to sulfur dioxide, and a minor proportion is converted to sulfur trioxide. These gases are conventionally removed from the regeneration zone, or regenerator, as a portion of the regenerator flue gas effluent stream.

It is known, e.g., as described in U.S. Pat. No. 3,835,031, that certain high activity catalysts formed by compositing compounds comprised of alkaline-earth or Group II-A metals such as magnesium and calcium with a crystalline aluminosilicate, or "molecular sieve" component dispersed in a silica-alumina matrix, will transfer sulfur from the regenerator, where it is present in the form of sulfur oxides, to the reactor where the sulfur is released as hydrogen sulfide with the flue gas from the reactor.

The chemistry of the sulfur transfer reaction between the alkaline earth or Group II-A metal, e.g., magnesium in the form of an oxide as disclosed in U.S. Pat. No. 3,835,031, supra, is believed to proceed in the regenerator as follows:

$$MgO + \tfrac{1}{2}O_2 + SO_2 \rightarrow MgSO_4 \qquad (1)$$

The reaction, however, does not go to completion.

The sulfur, to the extent that it forms magnesium sulfate, becomes unavailable for exit with the flue gas from the regenerator and it is passed to the reactor. The reactions which are believed to occur in the reactor, and stripper are as follows:

$$MgSO_4 + 4H_2 \rightarrow MgS + 4H_2O$$
$$MgS + H_2O \rightarrow MgO + H_2S \qquad (2)$$

On stripping, the magnesium sulfide is thereby hydrolyzed with steam and the sulfur exits with the reactor flue gas as hydrogen sulfide. The recovery of hydrogen sulfide from the reactor flue gas is considerably less expensive than the removal of sulfur oxides from the regenerator flue gas. This is because it is relatively simple to separate the $C_3^+$ liquid hydrocarbons from the off gases from the reactor in a gas recovery unit and scrub the off gases from the reactor with an amine solution to remove the hydrogen sulfide. This is inexpensive as compared with the separation of sulfur oxides from a regenerator flue gas by conventional methods; and, of course, this type of operation is far superior to one wherein sulfur must be recovered in two separate operations from the flue gases of both the regenerator and reactor. The Group II-A metals might also be composited on a silica-magnesia support to promote sulfur transfer. However, octane losses result from the use of these types of catalysts prepared with a silica-magnesia matrix and, for these reasons, even the complete removal of sulfur oxides from regenerator flue gas in this manner cannot compensate for these adverse consequences. Thus, the formation of catalysts by the addition of the alkaline earth or Group II-A metals to such supports causes the octane rating of the gasoline or naphtha fraction to be substantially reduced, typically by 1 or 2 octane numbers.

Various promoters have been added to such catalysts for the purpose of improving coke burn off. In U.S. Pat. No. 2,647,860 it is proposed to add chromic oxide to a cracking catalyst to promote combustion of carbon monoxide to carbon dioxide and to prevent afterburning. U.S. Pat. No. 3,364,136 discloses the use of particles containing a small pore molecular sieve with which is associated a transition metal from Groups I-B, II-B, VI-B, VII-B and VIII of the Periodic Table, or compounds thereof. In U.S. Pat. No. 4,072,600, Group VIII noble metals or rhenium have been added as promoters to cracking catalysts to promote carbon monoxide combustion in the regenerator.

In U.S. Pat. No. 4,115,250 there is also presented a survey of prior art patents relating to carbon monoxide combustion promoters for use in catalytic cracking processes. The patent, additionally specifically discloses a process and catalyst useful for promoting both carbon monoxide combustion and sulfur oxides oxidation. The process is one for reducing the amount of carbon monoxide and sulfur oxides in the flue gas from the regenerator by contacting and reacting carbon monoxide and oxygen, in the presence of molecular oxygen, with a carbon monoxide oxidation promoter comprised of a Group VIII noble metal or compound of a Group VIII noble metal, or copper and chromium associated with a particulate solid which is physically admixed with a cracking catalyst. The catalyst is constituted of a substantially silica-free alumina phase free from said metals or compound of said metals. Sulfur oxides are reacted in the regenerator flue gas with silica-free alumina as a discrete phase of the catalyst to form a sulfur-containing solid in the catalyst, and hydrogen sulfide is formed in the cracking zone by contacting the sulfur-containing solid with the hydrocarbon feed.

In the past, it has been common practice to dispose of the regenerator flue gas as waste by simply venting it as a plume to the atmosphere. Within recent years, however, sulfur pollution, particularly sulfur oxides pollution, has been recognized as a serious health hazard, and such method of disposal is no longer a viable option. The Clean Air Act requires that significant amounts of the sulfur be removed from a flue gas prior to its discharge to the atmosphere. Whereas it is a relatively simple matter to scrub sulfur, as hydrogen sulfide, from reactor flue gases, it is not so simple, as suggested, to remove sulfur oxides from regenerator flue gases. Moreover, the removal of sulfur is not so simple even with the use of Group II-A sulfur transfer catalysts, for these catalysts are not nearly as effective as desirable. There is a basic need in the industry for more effective sulfur transfer catalysts, and processes for promoting effective sulfur transfer from the regenerator to the reactor.

It is, accordingly, a primary objective of the present invention to supply these needs, particularly by providing catalyst and process capable of catalytically cracking a sulfur-containing hydrocarbon feed, while simultaneously, substantially eliminating sulfur oxides from the effluent gas streams of the regenerators (or regeneration zones) of catalytic cracking units.

A particular object is to provide said novel catalyst, and process utilizing said catalyst within the reactor (or reaction zone) of a catalytic cracking unit to provide an effective sulfation step in the regenerator as represented by equation (1), supra, to convert significantly all of the sulfur to a sulfate for transfer to the reactor for cracking sulfur-containing hydrocarbon feeds, whereupon the sulfur is then reacted and evolved as hydrogen sulfide with the reactor flue gas; from which reactor flue gas effluent the hydrogen sulfide can be much more readily, and economically removed.

These objects and others are achieved in accordance with the present invention embodying a catalyst, and process utilizing said catalyst for catalytically cracking a sulfur-containing hydrocarbon feed, and for the fixation of sulfur by the catalyst and transfer thereof from the catalyst regeneration zone to the reaction zone of a catalytic cracking unit. The catalyst comprises an admixture of composite particles, one type of particle being present in major concentration for providing principally cracking and combustion promoting functions, and the other present in lesser concentration for providing principally sulfur fixation and transfer functions. The major component particle, or particle which provides the cracking and combustion promoting functions, is constituted essentially of one or more Group VIII noble metals (Periodic Table of the Elements, Sargent-Welch Scientific Company, Copyright 1968) preferably platinum, composited with a support comprised of a crystalline alumino silicate (or "molecular sieve") component distributed in an active cracking catalyst matrix, suitably one constituted of a refractory inorganic oxide, preferably silica-alumina; and it may also contain clays, or alumina, or both, etc. The minor component particle, or particle which provides the sulfur fixation and transfer functions, on the other hand, is comprised of one or more alkaline-earth metals, or alkaline-earth metal compounds, i.e., a metal, or metals of Group II-A, preferably magnesium, composited with a refractory inorganic oxide support, suitably silica-magnesia or silica-alumina, which may also contain a crystalline aluminosilicate zeolite component dispersed within a silica-magnesia or silica-alumina support matrix; and which may also contain clays, or alumina, or both, etc. Additional components may also be present in the circulating catalyst stream such as an oxidation promoter contained on a suitable support.

In the regeneration zone coke is burned from the catalyst, the alkaline earth metal oxide, e.g., the magnesium oxide, being further oxidized to produce magnesium sulfate as in equation (1), supra. This reaction is believed to involve two steps, an oxidation step as follows:

$$SO_2 + \tfrac{1}{2}O_2 \rightarrow SO_3 \qquad (3)$$

and a fixation step, as follows:

$$MgO + SO_3 \rightarrow MgSO_4 \qquad (4)$$

The major component particle, aside from providing a cracking function, promotes combustion and increases the oxidation of sulfur dioxide to sulfur trioxide in the regenerator, as in step (3), supra, thereby increasing the driving force for the fixation reaction wherein sulfur trioxide is reacted with the alkaline-earth metal oxide to form an alkaline-earth metal sulfate, as in step (4), supra. The major component particle, aside from its role of providing a cracking function, provides a synergistic effect whereby greater amounts of the sulfur is converted to the sulfate and transferred to the reactor wherein it is reacted as in step (2), supra, and released as hydrogen sulfide with the cracked products.

The major component particle of the catalyst mixture is employed in concentration greater than 50 percent, based on the weight of the total catalyst mixture, but preferably the major component particle is employed in concentration ranging from greater than 50 percent to about 95 percent, and more preferably from about 90 percent to about 95 percent. The minor component particle is preferably employed in the catalyst mixture in concentration ranging from about 5 percent to just below 50 percent, more preferably from about 5 percent to about 10 percent, based on the weight of the total catalyst mixture.

The limiting factor in the sequence of steps (3) and (4) is thus believed reaction (3), or oxidation step wherein the sulfur dioxide reacts with the oxygen to form sulfur trioxide. The fixation step (4) is quite rapid, and hence the effectiveness of the overall sulfur transfer reactions is believed to depend on the rate at which the sulfur dioxide is converted to sulfur trioxide. In accordance with the present invention, a very large part or essentially all of the sulfur within the regeneration is converted into magnesium sulfate, or fixed, and the sulfur is therefore rendered unavailable for the formation of sulfur oxides, or other compounds which could be evolved from the regeneration zone as a part of the regenerator flue gas. Thus, the sulfur is fixed, and then returned to the reaction zone as a sulfate wherein it is further reacted and evolved as hydrogen sulfide with the reactor flue gas. Additionally, a bonus benefit of the catalyst of this invention is that wherein within the regenerator the combustion of CO to $CO_2$ is promoted, this yielding additional heat economies and emission control benefits.

In the preparation of either the major and minor component particles the metal, or metals, are suitably added to a particle by impregnation; and the composites are subsequently calcined. Exemplary of the Group VIII noble metals added to the major component particles are ruthenium, rhodium, palladium, osmium, iridium, platinum and the like, and exemplary of the Group II-A metals added to the minor component particles are berylium, calcium, strontium, barium, magnesium and the like. Magnesium, and platinum or palladium, especially platinum, are added in the preferred combinations. Suitably, the Group VIII noble metal, or metals, is added as a salt, or salts, to a support, and it is added in concentration sufficient to provide from about 0.1 part to about 50 parts, preferably from about 0.1 part to about 10 parts, and more preferably from about 0.1 part to about 1 part metallic metal, based on a million parts by weight of the total catalyst (dry basis). The Group II-A metal, on the other hand, is added to a support in concentration ranging from about 1 percent to about 50 percent, preferably from about 5 percent to about 20 percent, based on the weight of the minor component particles (dry basis). Though impregnation from an aqueous or nonaqueous solution is a preferred method of adding these components to a support, any of the conventional methods will suffice. Where more than one metal is added by impregnation, the support can be contacted in sequence with a solution which contains one metal, and then with a solution which contains another; or more than one metal may be added simultaneously from a single solution.

In its preferred aspects the process is one wherein a conventional sulfur-bearing catalytic cracker feed, suitably a gas oil, is catalytically cracked in a reaction zone at conditions such as described below:

| Major Operating Variables | Typical Process Conditions | Preferred Process Conditions |
| --- | --- | --- |
| Pressure, Psig | 0–50 | 5–30 |
| Reactor Temp., °F. | 800–1100 | 900–1030 |
| Space Velocity, W/W/Hr | 2–200 | 5–150 |
| Catalyst/Oil Ratio, (Instantaneous Vol. of Reactor Space) lbs./per lb. of oil | 2–12 | 4–8 |

During the cracking reaction lower boiling hydrocarbon components are formed, and sulfur is deposited on the catalyst with the coke and transported to the regeneration zone.

The coked sulfur-containing catalyst is stripped of volatiles, and then transferred to the regeneration zone. There, the catalyst is contacted with a gas containing controlled amounts of molecular oxygen to burn off the coke, this being accomplished at temperatures ranging from about 1000° F. to about 1500° F., preferably from about 1100° F. to about 1400° F., at residence times ranging from about 0.1 hour to about 1 hour, preferably from about 0.1 hour to about 0.2 hour. Generally, a residue of from about 0.05 percent to about 0.8 percent coke, based on the weight of the catalyst (dry basis), remains after regeneration. During the coke burn the flue gases which are evolved generally contain no more than about 300 parts per million by volume (vppm) sulfur, which constitutes about a ninety percent reduction as contrasted with operations with conventional sulfur transfer catalysts. After regeneration the catalyst is recycled to the catalytic reaction zone.

The invention will be more fully understood by reference to the following non-limiting examples which present comparative data illustrating its more salient features. All parts are given in terms of weight.

EXAMPLE 1

The following demonstrates that MgO will act to effect sulfur transfer. However, a catalyst prepared with a silica/magnesia matrix for the purpose of effecting sulfur transfer is generally to be avoided because silica/magnesia, as earlier suggested, is very detrimental to octanes. This is shown by the following comparative data set forth in Table I. The data was obtained by cat cracking a virgin gas oil at similar conditions, over rare earth exchanged catalysts, similar except that one of the catalysts was constituted of silica/magnesia matrix, which also contains about 20 percent kaolin, and the other of silica/alumina matrix.

TABLE I

Silica-Magnesia Matrix Effects on Cracked Product Yield Composition[1]

| Matrix | $RE_2O_3$-Exchanged Synthetic Fuajasite CREY[2] | |
| --- | --- | --- |
| | Silica/Magnesia | Silica/Alumina |
| Conversion: Vol. % | 77.0 | 77.0 |
| Hydrogen: Wt. % FF | 0.04 | 0.04 |
| $C_1 \div C_2$: Wt. % FF | 1.8 | 2.0 |
| Total $C_3$'s: Vol. % FF | 8.7 | 12.0 |
| Total $C_3$-Olefin: Vol. % FF | 7.6 | 10.8 |
| Total $C_4$'s: Vol. % FF | 9.0 | 11.2 |
| Total $C_4$-Olefin: Vol. % FF | 3.8 | 4.8 |
| Total i-$C_4$: Vol. % FF | 4.6 | 5.8 |
| $C_5^+$ Gasoline: Vol. % FF | 69.5 | 65.0 |
| $C_5^+$ Gasoline/Conversion | 0.90 | 0.84 |
| Octane No. | | |
| RON + 0: | 88.0 | 90.0 |
| RON + 3 cc TEL | 97.1 | 97.6 |
| MON + 0: | 76.0 | 78.7 |
| MON + 3 cc TEL | 84.5 | 86.5 |
| Gravity: °API | 61.1 | 56.7 |
| Aniline Point: °F. | 98 | 81 |
| Light Crude OIl: Vol. % FF | 14.3 | 10.0 |
| Gravity: °API | 20.8 | 16.0 |
| Aniline Point: °F. | 90 | 78 |
| 640° F. + Residue | | |
| Gravity: °API | 7.0 | 11.2 |
| Aniline Point: °F. | 118 | 148 |
| Coke: Wt. % FF | 3.8 | 3.8 |

[1]Constant severity, WHSV = 10, c/o = 4.0, reactor temp. = 920° F.
[2]Calcined rare earth exchanged Y-type faujasite.

EXAMPLE II

Table II, a tabulation of data from additional runs, illustrates the effect of the present invention with rare earth exchanged faujasite containing catalysts. Catalyst A, as demonstrated in the table represents a commercially available catalyst which was impregnated with 2 wt. % MgO. Catalyst B was constituted of a dry blend of 90% Catalyst A plus 10% of a commercially available zeolite catalyst made with a silica/magnesia matrix. Catalyst C was constituted of a dry blend of 90% of a Pt promoted (15 ppm Pt) commercially available catalyst with 10% of a commercially available zeolite catalyst made with a silica/magnesia matrix.

In these tests a synthetic flue gas was passed over 20 grams of each catalyst placed in a 1200° F. captive fluid bed. The synthetic flue gas was composed of 6.8 Vol. % $O_2$, 9.0 Vol. % CO, 84.0 Vol. % $N_2$ and contained 2300 vppm $SO_2$. The synthetic flue gas was fed to the captive fluid bed at a rate of 180 cc/min for a period of 20 minutes. The results are based on analytical measurements obtained on a sample taken 15 minutes into the 20 minute test period.

TABLE II

| Catalyst | A | B | C | |
|---|---|---|---|---|
| Flue Gas | | | | Feed |
| $SO_2$, vppm | 1783 | 1450 | 292 | 2300 |
| $CO_2$/CO | 0.83 | 0.81 | ∞ | 0 |

The performance of Catalyst A shows, as known in the art, that the incorporation of MgO results in some reduction of $SO_2$ in the flue gas. The performance of Catalyst B that comprises a relatively small amount of silica/magnesia containing catalyst provides a comparable reduction in $SO_2$ emissions. The performance of Catalyst C shows that a small amount of an oxidation promoter operating in conjunction with a sulfur transfer agent results in dramatically lower $SO_2$ emissions than would be expected from the presence of 10% of a silica/magnesia catalyst (the sulfur transfer agent) in the composite catalyst without the noble metal promoter.

EXAMPLE III

The data presented in Table III below illustrates that the catalyst system of the present invention provides a synergistic reduction in $SO_2$ emissions when a small amount of MgO is impregnated on a rare earth exchanged faujasite containing catalyst. In these tests, Catalyst D is representative of commercially available Davison CBZ-1 catalyst which contains rare earth treated faujasite contained in a silica-alumina matrix with added kaolin. It is impregnated with 2 wt. % MgO. Catalyst E is a dry blend of a commercially available catalyst which contains essentially no MgO and 2 wt. % of a commercially available oxidation promotion catalyst known to contain Pt. Catalyst F was constituted of a dry blend of 98 wt. % Catalyst A and 2 wt. % of a commercially available oxidation promotion catalyst known to contain Pt.

These tests were performed identically to those of Example I except that the synthetic flue gas consisted of 6.2 Vol. % $O_2$, 6.8 Vol. % CO, 1.7 Vol. % $CO_2$, 85.0 Vol. % $N_2$ and 1700 vppm $SO_2$.

TABLE III

| Catalyst | D | E | F |
|---|---|---|---|
| % $SO_2$ Reduction | 18 | 36 | 99+ |
| Flue Gas $CO_2$CO | 3.6 | — | ∞ |

The performance of Catalyst D shows that impregnation of MgO results in a small reduction in $SO_2$ emissions. The performance of Catalyst E shows an enhanced reduction in $SO_2$ but this is probably an oxidation of $SO_2$ to $SO_3$. The performance of Catalyst F demonstrates a remarkable synergistic effect when both the oxidation promoter and the sulfur transfer agent are employed in the catalyst system of the present invention.

EXAMPLE IV

The data presented in Table IV below illustrates that the present invention provides a synergistic reduction in $SO_2$ emissions with ultra stable Y faujasite containing catalysts. The test procedure and gas composition for this example are the same as those for Example I. In the tests, Catalyst G was constituted of a catalyst comprising ultra stable Y faujasite and porous alumina in a silica/alumina matrix. Catalyst H was a replicate of Catalyst G but contains 170 ppm Pd. Catalyst I was a replicate of Catalyst G impregnated with 2 wt. % MgO. Catalyst J was a dry blend of 50 wt. % Catalyst H and 50 wt. % Catalyst I.

TABLE IV

| Catalyst | G | H | I | J | |
|---|---|---|---|---|---|
| Flue Gas | | | | | Feed |
| $SO_2$, vppm | 1961 | 1741 | 2196 | 1270 | 2300 |
| $CO_2$/CO | 0.96 | ∞ | 1.06 | ∞ | 0 |

The performance of Catalyst G shows perhaps a marginal $SO_2$ emission reduction; perhaps provided by the alumina. The performance of Catalyst H shows that the mere incorporation of Pd alone did not markedly reduce $SO_2$ emissions. The performance of catalyst I indicates that the mere impregnation of MgO does essentially nothing to reduce $SO_2$ emissions on a USY catalyst. However, the performance of Catalyst J demonstrates a synergistic effect on USY containing catalyst when both an oxidation promoter and a sulfur transfer agent are used.

EXAMPLE V

The data presented in Table V show that impregnation of MgO into a USY containing catalyst is very detrimental to octanes. These data were obtained in a fully integrated (reactor-stripper-regenerator) pilot plant at a 4 catalyst-to-oil ratio and 925° F. with a conventional gas oil feed.

In the data presented, Catalyst K was constituted of a catalyst comprising ultra stable Y faujasite and porous alumina in a silica/alumina matrix. Catalyst L was a similar catalyst impregnated with 0.85 wt. % MgO. Both catalysts were steamed at 1400° F. for 16 hours with 100% steam at 0 psig to simulate equilibration prior to evaluation.

TABLE V

| Catalyst | K | L |
|---|---|---|
| Yields @ 70 Vol. % 430° F. Conversion | | |
| $C_5$/430° F., Vol % | 60.5 | 61.5 |
| $C_4^=$, Vol. % | 8.6 | 8.0 |
| $C_3^=$, Wt. % | 4.2 | 3.9 |
| Coke, Wt. % | 2.80 | 3.30 |
| Dry Gas, Wt. % | 6.1 | 5.7 |
| $C_5$/430° F., Octanes | | |
| RONC | 93.4 | 92.1 |
| MONC | 80.8 | 79.5 |

The results show that such an impregnation is detrimental to octanes, both research and motor.

Having described the invention, what is claimed is:

1. A catalyst composition for catalytically cracking a sulfur-containing hydrocarbon feed, and for the fixation of sulfur by the catalyst and transfer thereof from the catalytic regeneration zone to the catalytic cracking zone of a catalytic cracking unit, between which zones the catalyst composition is circulated, which comprises an admixture of composite particles, a major component particle in concentration of greater than 50 percent, based on the total weight of the catalyst, constituted of a Group VIII noble metal composited on an aluminosilicate zeolite-containing refractory inorganic oxide support in concentration ranging from about 1 part to about 50 parts, per million parts by weight of total catalyst, for providing principally cracking and combustion promoting functions, and a minor component particle present in the admixture in concentration of less than 50 percent, based on the total weight of the catalyst, constituted of a Group II-A metal composited with a refractory inorganic oxide support in concentration ranging from about 1 percent to about 50 percent, based on the weight of the minor component particles.

2. The composition of claim 1 wherein the support of the major component particles is comprised of an aluminosilicate zeolite dispersed in a silica-alumina matrix.

3. The composition of claim 2 wherein the zeolite of the support of the major component particles is rare earth exchanged.

4. The composition of claim 1 wherein the support of the major component particles is comprised of ultrastable Y faujasite and porous alumina dispersed in a silica alumina matrix.

5. The composition of claim 1 wherein the refractory inorganic oxide support of the minor component particles is comprised of an aluminasilicate zeolite dispersed in a silica magnesia matrix.

6. The composition of claim 5 wherein the aluminosilicate zeolite of the support of the minor component particles is rare earth exchanged.

7. The composition of claim 1 wherein the major component particles are present in the admixture in concentration ranging greater than 50 percent to about 95 percent.

8. The composition of claim 1 wherein the major component particles are present in the admixture in concentration ranging from about 90 percent to about 95 percent.

9. The composition of claim 1 wherein the minor component particles are present in the admixture in concentration ranging from about 5 percent to just below 50 percent.

10. The composition of claim 1 wherein the minor component particles are present in the admixture in concentration ranging from about 5 percent to about 10 percent.

11. The composition of claim 1 wherein the Group VIII noble metal contained on the major component particles of the admixture is platinum or palladium.

12. The composition of claim 11 wherein the concentration of the Group VIII noble metal component ranges from about 0.1 part to about 10 parts, per million parts by weight of total catalyst.

13. The composition of claim 12 wherein the concentration of the Group VIII noble metal ranges from about 0.1 part to about 1 part.

14. The composition of claim 1 wherein the Group II-A metal component contained on the minor component particles of the admixture is magnesium.

15. The composition of claim 14 wherein the concentration of the Group II-A metal component contained on the minor component particles of the admixture ranges from about 5 percent to about 20 percent.

* * * * *